(12) United States Patent
Nonninger et al.

(10) Patent No.: US 7,135,114 B2
(45) Date of Patent: Nov. 14, 2006

(54) FILTRATION DEVICE

(75) Inventors: Ralph Nonninger, Saarbrücken (DE);
Olaf Binkle, Kirkel (DE); Romeo Volz, Wadgassen (DE); Hans-Jürgen Schmidt, Salem (DE)

(73) Assignee: ItN Nanovation GmbH, Saarbrucken (DE)

( * ) Notice: Subject to any disclaimer, the term of this patent is extended or adjusted under 35 U.S.C. 154(b) by 0 days.

(21) Appl. No.: 10/545,113

(22) PCT Filed: Nov. 19, 2003

(86) PCT No.: PCT/DE03/03831

§ 371 (c)(1),
(2), (4) Date: Mar. 27, 2006

(87) PCT Pub. No.: WO2004/071620

PCT Pub. Date: Aug. 26, 2004

(65) Prior Publication Data

US 2006/0163142 A1 Jul. 27, 2006

(30) Foreign Application Priority Data

Feb. 13, 2003  (DE)  ................................ 103 05 865

(51) Int. Cl.
*B01D 29/39* (2006.01)
*B01D 29/88* (2006.01)
*B01D 39/20* (2006.01)

(52) U.S. Cl. ................... 210/323.1; 210/312; 210/314; 210/321.75; 210/321.84; 210/346; 210/416.1; 210/433.1; 210/488; 210/498; 55/482; 55/523

(58) Field of Classification Search ................ 210/232, 210/299, 307, 312, 314, 321.75, 321.84, 210/323.1, 333.01, 346, 416.1, 433.1, 455, 210/459, 460, 463, 483, 486, 488, 490, 498, 210/503, 504, 506, 510.1; 55/482, 484, 523
See application file for complete search history.

(56) References Cited

U.S. PATENT DOCUMENTS

| | | | |
|---|---|---|---|
| 3,737,036 A | 6/1973 | Kasten | |
| 4,369,112 A | 1/1983 | Vincent et al. | |
| 5,035,799 A | 7/1991 | Rosberg et al. | |

FOREIGN PATENT DOCUMENTS

| | | | |
|---|---|---|---|
| DE | 24 61 778 A1 | | 8/1976 |
| DE | 198 07 769 A1 | | 8/1999 |
| EP | 0 340 914 B1 | | 3/1993 |
| GB | 1 524 219 | | 9/1978 |
| JP | 58-30306 | * | 2/1983 |
| JP | 61-259703 | * | 11/1986 |

OTHER PUBLICATIONS

English abstract of Japanese Patent No. 58-30306.*
English abstract of Japanese Patent No. 61-259703.*

* cited by examiner

*Primary Examiner*—John Kim
(74) *Attorney, Agent, or Firm*—Walter A. Hackler

(57) ABSTRACT

In a filtration device (1) comprising a pressure-resistant housing (2) with a liquid inlet opening (3) and an outlet opening (4) for filtered matter, into which a collecting channel (12) terminates, at least one filter element (8–11) designed as flat membrane is connected to the collecting channel (12) in a pressure-tight manner. This device provides a high liquid throughput at the same time having a compact construction.

10 Claims, 2 Drawing Sheets

FILTRATION DEVICE

BACKGROUND OF THE INVENTION

The invention concerns a filtration device for filtering liquids.

In particular, for additional treatment of drinking water, it may be required to remove certain substances which are contained in the drinking water. Bacteria and viruses can be removed through corresponding chemical treatment of the water. Devices for this purpose, however, require a relatively large amount of maintenance since the chemicals must be refilled. The water is moreover polluted by the chemicals.

Filters are used e.g. to separate oil-water emulsions in cutting production, to clarify beer, for gas purification, gas separation or separation of liquid-solid mixtures.

OBJECT OF THE INVENTION

It is the object of the present invention to provide a compact filtration device which is easy to handle and has good filtering properties for removing substances, in particular, bacteria and/or viruses from a liquid.

SUMMARY OF THE INVENTION

This object is achieved in accordance with the invention by a filtration device which comprises a pressure-resistant housing with a liquid inlet opening and an outlet opening for filtered matter in which a collecting channel terminates which is connected to at least one filter element, which is designed as flat membrane, in a pressure-tight manner.

The liquid to be filtered is supplied to the container via the liquid inlet opening which may be connected to a feed line. The liquid in the container is pressurized and is forced by the pressure through the flat membrane, wherein there is a pressure difference between the outer side of the flat membrane and its inside. The housing is suited to accommodate the pressures generated during filtering and is therefore pressure-resistant. The housing may have various shapes, e.g. a cuboid or cylindrical shape. The flat membrane may be designed as porous functional layer. The filtered matter is discharged from its inside, wherein the liquid to be filtered flows against the flat membrane from almost any side. For filtering smaller substances, the flat membrane may comprise a fine-pored filtering functional layer which is held on a coarse-pored carrier layer, a so-called substrate. The functional and carrier layers are preferably inorganic layers and are therefore resistant to wear, temperature-stable and largely chemically inert. A flat membrane against which the flow can flow from almost any side and from the inside of which the filtered matter can be discharged, has a favorable ratio between membrane surface and volume of the membrane which results in good efficiency. The filtered matter is supplied from the inside of the flat membrane to the collecting channel and can be discharged or suctioned via the outlet opening. The filter element may be connected to the collecting channel either directly or indirectly via additional structures, wherein the connection between the filter element and the collecting channel is always pressure-tight to prevent unfiltered liquid from getting into the collecting channel. A line with a valve, e.g. a water tap, can be connected to the outlet opening. The functional layer may be selected to have pores which are smaller than the substances to be filtered. The liquid to be filtered in accordance with the invention is a dispersion agent which contains gaseous, liquid or solid substances, in particular solutions, hydrosols, bubble systems, emulsions and suspensions.

In a particularly preferred embodiment, several filter elements are connected to the collecting channel behind one another and at a separation from each other. In this manner, the filtering surface can be increased requiring little space. Due to the separated arrangement, the liquid can be pressed into the membrane from all sides, in particular, from the two large-surface sides. This is particularly advantageous if the inside of the flat membrane is designed as carrier layer whose entire outer surface is provided with a functional layer. The filtered matter can therefore be pressed into the membrane via almost the entire free outer surface thereof, and be discharged from the inside of the flat membrane.

In a particularly preferred manner, a sedimentation space is provided below the filter element. Through this measure, sediments may deposit below the filter element at a distance from the housing bottom which corresponds to at least the diameter of the collecting channel. Clogging of the filtering surfaces is prevented or delayed.

In a preferred further development, the sedimentation space has an outlet opening which can be closed. Deposited sediments can be removed. The filter elements and the housing can moreover be cleaned or rinsed.

The housing may be produced from plastic material, ceramic or stainless steel. A plastic housing is advantageous due to the small weight and good corrosion resistance. A stainless steel housing is advantageous due to its pressure resistance.

The filter elements can be removed and cleaned in a particularly easy manner if the housing comprises a cleaning opening. It is clear that, due to pressurization of the liquid to be filtered, the cleaning opening can be closed in a pressure-tight manner,. e.g. by a lid which can be screwed on. Alternatively, the housing may also be formed from several parts and be taken apart for cleaning.

To increase the pressure of the liquid to be filtered in the housing, the liquid inlet opening or the housing may be associated with a pump. In certain applications, a pressure of 1 to 7 bar may be sufficient. Additional pressurization of the liquid to be filtered may be required, in particular, for functional layers with small pore sizes to ensure functionality of the filtration device.

This object is also achieved by a filtration device comprising several filter elements which are designed as flat membranes and are separated from each other and whose interior is connected to a collecting channel in a pressure-tight manner, wherein substantially the entire outer surface of each filter element is formed as filtering surface. A filtration means of this type may be immersed e.g. into a basin containing a liquid to be filtered, wherein the hydrostatic pressure forces the liquid into the membranes. The immersed filter elements are completely surrounded by the liquid except for a few locations, e.g. the connecting point with the collecting channel. The outer surface of each filter element is therefore available as filtering surface. The separated arrangement moreover permits cleaning of the filter elements by guiding an air or ozone flow along the filtering surfaces. Removal of the collecting filter cake is extremely facilitated in this manner.

The filter element preferably comprises one or more channels for discharging the filtered matter, thereby facilitating discharge of the filtered matter from the filter element, in particular, from its inside. If a carrier layer is provided, the channels for discharging the filtered matter are preferably disposed in the carrier layer.

In a particularly preferred further development, the channels for discharging the filtered matter are disposed like a fan. The channels for discharging the filtered matter are oriented towards the collecting channel to accelerate discharge of the filtered matter.

The channels for discharging the filtered matter may basically have any cross-sectional shape. Substantially, a circular or elliptical or oval or rectangular or any polygonal cross-section is, however, preferred.

A filter element consisting of two filter element halves is easy to produce. Each filter element half may comprise a carrier layer and a functional layer or only one functional layer. The carrier layer and functional layer can be produced from green layers, wherein layers which contain ceramic particles but have not been sintered yet are called green layers. In particular, if the layers are green layers, the carrier layers of the filter element halves which carry a functional layer can be laminated to each other before sintering. After sintering, a filter element is obtained which has fine-pored filtering surfaces on the outside and a coarse-pored structure on the inside through which the filtered matter can be discharged. If the filter halves each consist exclusively of a functional layer, these can also be laminated as green layers. The filter element halves or the entire filter element may also be produced through extrusion.

The ceramic materials used in the green layers are preferably made from metal (mixed) oxides and carbides, nitrides, borides, silicides and carbon nitrides of metals and non-metals. Examples thereof are $Al_2O_3$, partially and completely stabilized $ZrO_2$, mullite, cordierite, perovskite, spinels, e.g. $BaTiO_3$, PZT, PLZT and SiC, $Si_3N_4$, $B_4C$, BN, $MoSi_2$, $TiB_2$, TiN, TiC and Ti(C,N). It is clear that this list is incomplete. It is of course also possible to use mixtures of oxides or non-oxides and mixtures of oxides and non-oxides.

The channels for discharging filtered matter can be realized in a particularly simple manner if at least one filter element half comprises grooves on its surface facing the other filter element half. The grooves are preferably formed through milling of the green carrier layer. The grooves may be provided only in one or both carrier layers. If the carrier layers are laminated, the grooves may be offset from each other or be disposed opposite to each other. If they are disposed opposite to each other, channels having a large cross-section are formed in the filter element.

Almost any filter element geometry can be realized by producing the filter element halves in each case through foil casting of a green layer and subsequent sintering. The filter elements may e.g. be circular, square or rectangular. On the one hand, the filter arrangements can be minimized, wherein five filter elements create a filtering surface of 0.1 m². On the other hand, filter elements having a very large surface, e.g. for sea water desalination, can be produced through foil casting. The filtration elements may e.g. have a width of up to 0.5 m and any length which permits production of filter modules having a filtering surface of e.g. 45 m² which are built from several filter elements.

In a preferred embodiment, the filter element is inserted, stuck on or glued into the collecting channel in a sealing manner. If it is inserted or stuck on, it can be easily removed from the filtration device for cleaning and, in particular, boiling. It is, however, also feasible to form the collecting channel in one piece with the filter element(s) to obtain good sealing, in particular, pressure-resistant sealing between the collecting channel and the filter elements.

In a further development, an O-ring is provided to provide effective and simple sealing.

In a preferred embodiment of the invention, the filter elements have pores in a functional layer of a pore size of $\leq 300$ nm. The pore size used depends on the respective application of the filtration device. For filtering bacteria, the pore size is e.g. preferably $\leq 150$ nm and for filtering viruses preferably $\leq 70$ nm.

The filtration device is advantageously disposed in a liquid-transporting line system. It may be used in a water pipe system of a building and also in ships or caravans or the like. In particular for ships, caravans or the like, it can also be immersed into liquid containers.

In a further embodiment, at least the surfaces of the filtration device which contact the liquid, in particular, of the housing and the collecting channel, are coated with a biocide. This measure prevents clogging of the pores due to bacteria propagation within the filtration device.

The filtration result can be improved by cascading several filtration devices. In particular, a filtration device with filter elements of a first pore size for coarse filtering may be connected upstream of a filtration device with filter elements of a second smaller pore size. The first filtration device can e.g. filter bacteria and the second filtration device can filter viruses.

Further features and advantages of the invention can be extracted from the following description of an embodiment of the invention, the figures of the drawing, which show details which are essential to the invention, and the claims. The individual features may be realized individually or collectively in arbitrary combination in a variant of the invention.

Drawing

The schematic drawing shows an embodiment of the inventive filtration device which is explained in the following description.

BRIEF DESCRIPTON OF THE DRAWINGS

DESCRIPTION OF THE PREFERRED EMBODIMENT

Figure 1:
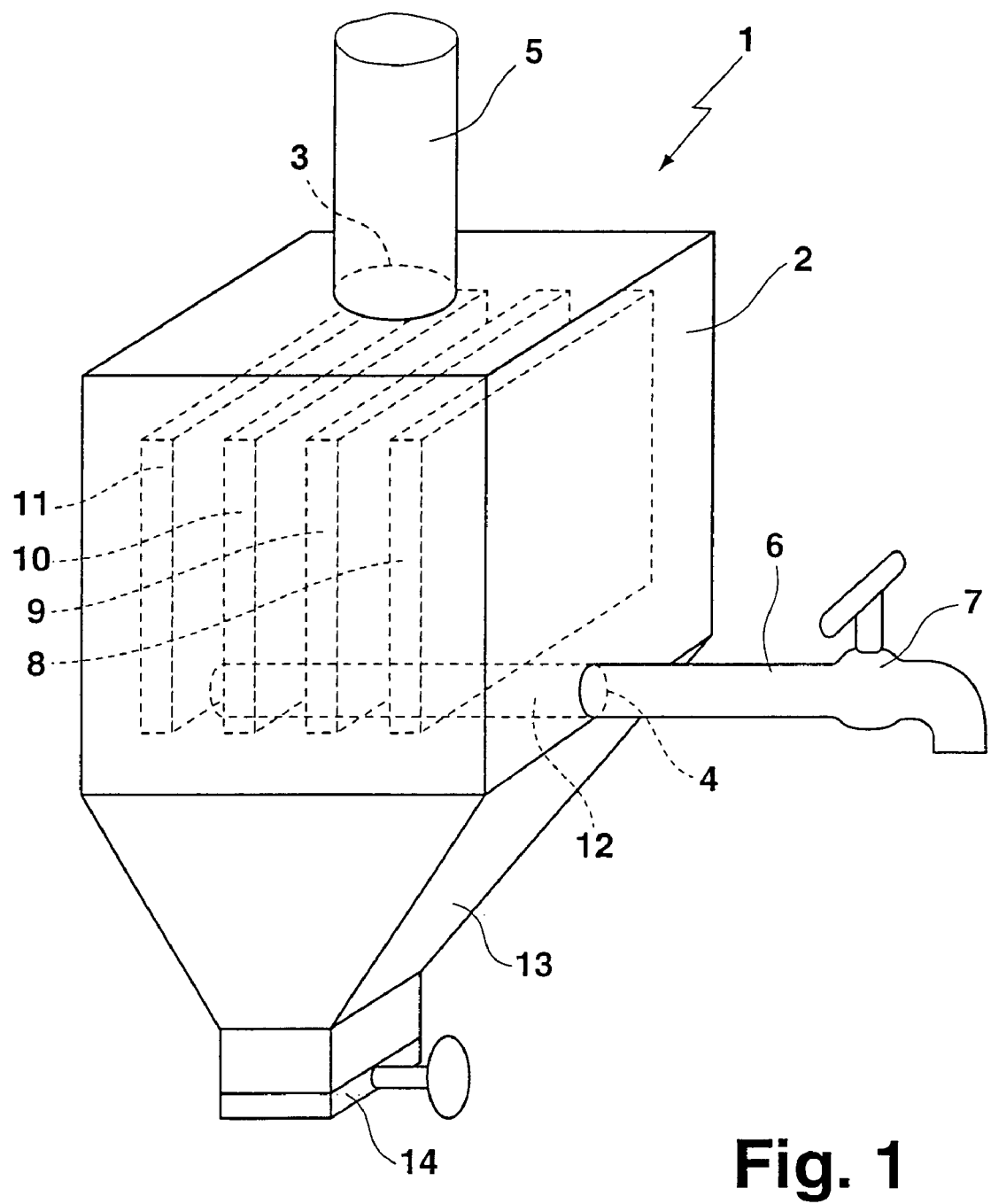
FIG. 1 shows a three-dimensional view of a filtration device.

FIG. 1 shows a filtration device 1 comprising a housing 2 and a liquid inlet opening 3 and an outlet opening 4 for filtered matter. The liquid inlet opening 3 is connected to a feed line 5 and the outlet opening 4 for filtered matter is connected to a line 6 having a valve 7, designed as water tap, at its free end. Filter elements 8 through 11 which are designed as flat membranes are disposed behind one another and at a separation from each other in the housing 2. The rectangular filter elements 8 through 11 are connected to a collecting channel 12 which opens into the discharge opening 4 for filtered matter. The liquid to be filtered is supplied to the housing 2 using pressure. Since the filter elements 8 through 11 are separated from each other, liquid can penetrate into each filter element substantially from two sides. In this embodiment, the filter elements 8 through 11 each have fine-pored functional layers on their outer surfaces and intermediate coarse-pored carrier surfaces via which the filtered matter is supplied from the inside of the filter elements 8 through 11 to the collecting channel 12. The lower part of the housing has a tapering sedimentation space 13 for collecting sediments. An outlet opening 14 which can be closed is provided to remove the sediments. The outlet opening 14 is located below the liquid inlet opening 3. If both openings 3, 14 are opened, the housing 2 and the filter elements 8 through 11 can be rinsed and, in particular, deposits can be removed from the pores of the functional layers of the filter elements. Moreover, the inventive device can be briefly closed through opening the outlet opening 14 while the liquid inlet opening 3 is open and the valve 7 is closed, permitting removal of the liquid supplied via the liquid inlet opening 3 without pressure loss and without additional filtration via the outlet opening 14.

Figure 2:
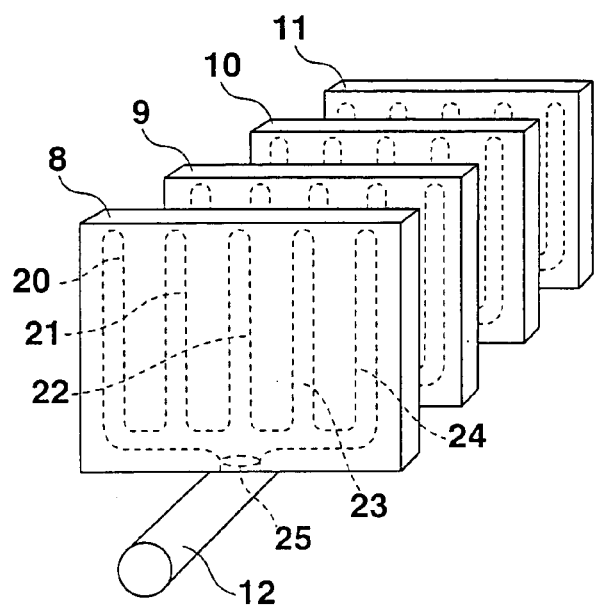
FIG. 2 shows a representation of four filter elements disposed one behind the other.

FIG. 2 shows the filter elements 8 through 11 which are disposed behind one another, wherein channels 20 through 24 for discharging filtered matter are indicated which are provided in the inside of the filter elements 8 through 11. The channels for discharging filtered matter are disposed in the respective carrier layer of the filter elements 8 through 11 and extend substantially vertically and parallel relative to each other. They terminate in an opening 25 which is sealingly connected to the collecting channel 12, wherein the filter elements 8 through 11 in the embodiment are glued to the collecting channel 12. The carrier layer of the filter elements 8 through 11 is produced through lamination of the green carrier layers of two filter element halves whose surfaces have grooves produced through milling. The opposing grooves form the channels 20 through 24 for discharging filtered matter.

Figure 3:
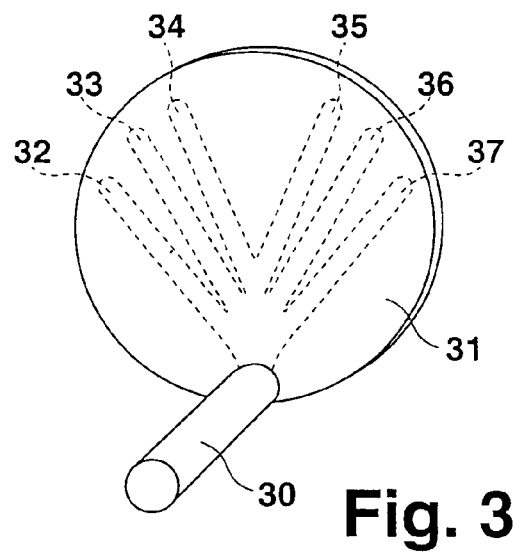
FIG. 3 shows an alternative embodiment of a filter element.

FIG. 3 shows a circular filter element 31 which is stuck onto a collecting channel 30. The channels 32 through 37 for discharging filtered matter are disposed like a fan and are oriented towards the collecting channel. The filter element 31 of the embodiment is formed from two filter element halves which each represent a functional layer. The channels 32 through 37 for discharging filtered matter are each formed from two opposite grooves. The grooves were introduced into the green layers which form the basis of the filter element halves. The filter element halves are subsequently laminated and sintered.

Figure 4:
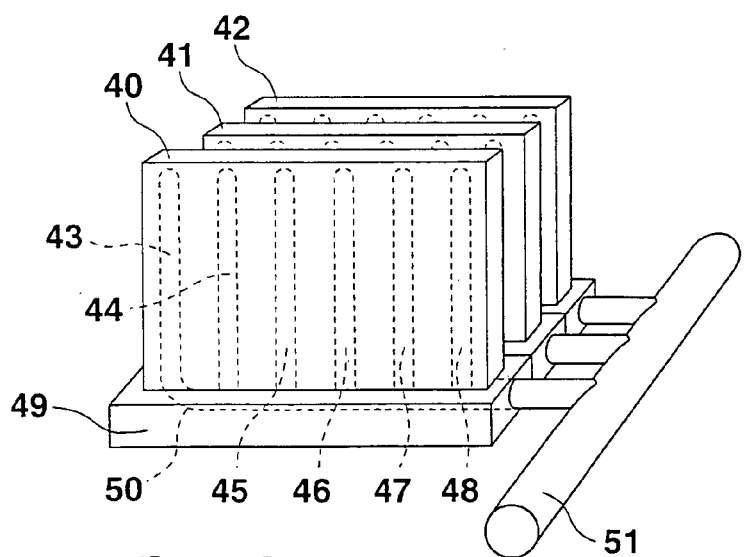
FIG. 4 shows a view of three filter elements, disposed behind one another, in a holder.

FIG. 4 shows an arrangement with three filter elements 40–42, each comprising six channels 43–48 for discharging filtered matter which are disposed in the inside of the filter elements 40–42, and extend in vertical and parallel directions relative to each other. The channels 43–48 for discharging filtered matter are closed at their upper ends and terminate at their other ends in an opening (not shown) on a narrow side of the filter element 40–42 each. The filter elements 40–42 are inserted in a pressure-tight manner into a holder 49 which is designed as plastic shoe and comprises channels 50 into which the filtered matter is discharged from the channels 43–48 for discharging filtered matter. The channels 50 are connected to a collecting channel 51. The collecting channel 51 of this embodiment is disposed substantially next to the filter elements 40–42.

In a filtration device 1 comprising a pressure-resistant housing 2 with a liquid inlet opening 3 and an outlet opening 4 for filtered matter, into which a collecting channel 12 opens, at least one filter element 8–11, designed as flat membrane, is connected to the collecting channel 12 in a pressure-tight manner. This device provides high liquid throughput, at the same time having a compact construction.

We claim:

1. Filtration device (1) comprising a pressure-resistant housing (2) with a liquid inlet opening (3) and an outlet opening (4) for filtered matter, into the outlet opening (4) a collecting channel (12; 30; 51) terminates, the collecting channel (12; 30; 50) is connected in a pressure-tight manner to at least one filter element (8–11; 31; 40–42) of a ceramic flat membrane, wherein the filter element (8–11; 31; 40–42) comprises one or more channels (20–24; 32–37; 43–48) inside the ceramic flat membrane for discharging filtered matter and connected to the collecting channel (12; 30; 51), and wherein a sedimentation space (13) is provided below the filter element (8–11; 31; 40–42) in the housing (2), wherein the filter element (8–11, 40–42) consists of two filter element halves and at least one filter element half has grooves on the surface facing the other filter element half to form one or more channels (20–24; 32–37; 43–48).

2. Filtration device according to claim 1, characterized in that several filter elements (8–11; 31; 40–42) are connected, one after another and being spaced apart from each other, to the collecting channel (12; 30; 51).

3. Filtration device according to claim 1, characterized in that the sedimentation space (13) comprises an outlet opening (14) which can be closed.

4. Filtration device according to claim 1, characterized in that the housing (2) is made of plastic material, ceramic or stainless steel.

5. Filtration device according to claim 1, characterized in that the housing (2) has an opening for cleaning.

6. Filtration device according to claim 1, characterized in that the liquid inlet opening (3) or the housing (2) is associated with a pump.

7. Filtration device according to claim 1, characterized in that the channels (32–37) for discharging filtered matter are disposed in the shape of a fan.

8. Filtration device according to claim 1, characterized in that the filter element halves are each produced through foil casting or extrusion of a green layer and subsequent sintering.

9. Filtration device according to claim 1, characterized in that the filter element(s) (8–11; 31) is/are inserted, stuck onto or glued into the collecting channel (12; 30) in a sealing manner.

10. Filtration device according to claim 1, characterized in that the filter elements (8–11; 31; 40–42) comprise pores of a pore size $\leq 300$ nm in a functional layer.

* * * * *